(12) United States Patent
West

(10) Patent No.: US 7,629,981 B1
(45) Date of Patent: Dec. 8, 2009

(54) SYSTEM AND METHOD FOR USING COMPUTER GRAPHICS TECHNIQUES TO GATHER HISTOGRAM DATA

(75) Inventor: Michael S. West, Austin, TX (US)

(73) Assignee: Overwatch Systems Ltd., Austin, TX (US)

( * ) Notice: Subject to any disclaimer, the term of this patent is extended or adjusted under 35 U.S.C. 154(b) by 353 days.

(21) Appl. No.: 11/592,821

(22) Filed: Nov. 3, 2006

(51) Int. Cl.
*G09G 5/00* (2006.01)
*G09G 5/02* (2006.01)
*G06K 9/46* (2006.01)
*G06K 9/36* (2006.01)
*G06K 9/32* (2006.01)
*G06F 19/00* (2006.01)

(52) U.S. Cl. ............... 345/592; 345/589; 345/606; 345/643; 382/203; 382/283; 382/300; 702/1; 702/54; 702/57

(58) Field of Classification Search ............... 345/428, 345/589, 592, 593, 599–600, 606, 640, 643; 382/162, 167, 201–203, 205–207, 254, 266, 382/276, 283, 300, 305; 702/1, 48–49, 52–54, 702/57
See application file for complete search history.

(56) References Cited

U.S. PATENT DOCUMENTS

| 2001/0040571 | A1* | 11/2001 | Miller | 345/419 |
| 2002/0118209 | A1* | 8/2002 | Hylen | 345/582 |
| 2002/0140597 | A1* | 10/2002 | Taylor et al. | 342/28 |
| 2006/0279813 | A1* | 12/2006 | Ozawa et al. | 358/538 |
| 2008/0228437 | A1* | 9/2008 | Damarla | 702/151 |

* cited by examiner

*Primary Examiner*—Wesner Sajous
(74) *Attorney, Agent, or Firm*—Campbell Stephenson LLP; Johnathan N. Geld

(57) ABSTRACT

A mechanism for gathering information from one or more detectors to aid in a determination of a current location of one or more entities is provided. Embodiments of the present invention perform these tasks by plotting data provided by the detectors onto a grid corresponding to a geographical area monitored by the detectors and then analyzing the plot for overlapping results using graphical techniques. Where measurements overlap, data associated with those measurements is provided to an analysis module to predict location and velocity of the entities. Aspects of the present invention provide an initial prediction of location and/or velocity of an entity in order to reduce convergence time of the analysis module.

24 Claims, 6 Drawing Sheets

SYSTEM AND METHOD FOR USING COMPUTER GRAPHICS TECHNIQUES TO GATHER HISTOGRAM DATA

FIELD OF THE INVENTION

The present invention is related to the field of entity detection and tracking. Specifically, the present invention relates to a graphical method for providing an initial position and velocity estimate of a detected entity to an analysis engine.

BACKGROUND OF THE INVENTION

One source of information for detecting and tracking entities is wireless communication. Wireless communications are a large part of everyday life. In certain scenarios, it is desirable to track the source of certain wireless communications. For example, police officers may wish to track a suspect through that suspect's use of a cell phone. As another example, a military battlefield may offer the opportunity to track multiple signal-emitting sources from both enemy and friendly forces. In another scenario, tracking signal locations of rescue workers during times of disaster recovery can enable better coordination of efforts. Such tracking of signal emitters is part of the field of communications intelligence, which is generally described as a collection capability for interception and decoding of communications traffic.

There are a multitude of different methods for gathering data that can contribute to a determination of the location of a detected entity. One such method is the use of a plurality of radio-frequency (RF) detectors. Other methods include the use of electro-optical/infrared (EO/IR) detectors, motion/proximity detectors, acoustic detectors, seismic detectors, radar systems, and numerous other civilian and military sensors. Such detectors can provide data such as lines of bearing (LOB) (i.e., a bearing angle to an RF emitter from the detector), a distance range from the detector to the emitter, time difference of arrival of a signal between two or more detectors, received power of a signal, and the like.

In a signal-rich environment, there can be a large number of signal emitters and a large number of detectors generating data about those signal emitters. One challenge in such an environment is to analyze the data from these various detectors in as rapid a fashion as possible in order to provide useful, timely tracking analysis of the location of a desired signal emitter or of a plurality of desired signaled emitters.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a mechanism for gathering information from one or more detectors to aid in a determination of a current location of one or more signal emitters. Embodiments of the present invention perform these tasks by plotting data provided by the detectors onto a grid corresponding to a geographical area monitored by the detectors and then analyzing the plot for overlapping results. Where measurements overlap, data associated with those measurements is provided to an analysis module to predict location and velocity of the signal emitters. In one embodiment of the present invention, such an analysis module can be a conjugate-gradient analysis tool utilizing a least squares fit to the available data. One aspect of this embodiment is to provide a good initial prediction of location and velocity of a signal emitter in order to reduce convergence time of the conjugate-gradient analysis tool.

Figure 1:
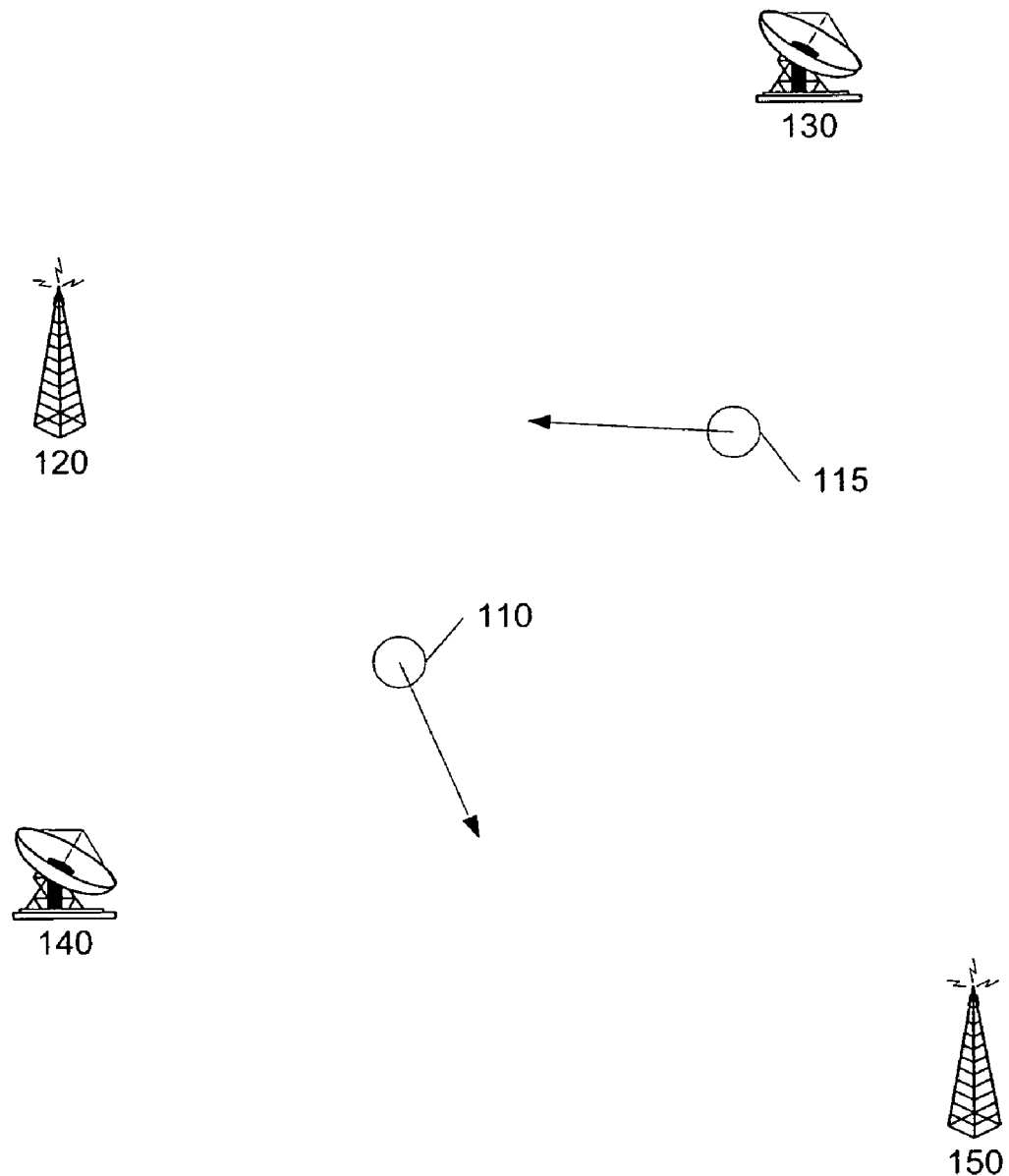
FIG. 1 is a diagram illustrating a simple environment in which embodiments of the present invention can be used.

FIG. 1 is a diagram illustrating a simple environment in which embodiments of the present invention can be used. Entities (e.g., signal emitters) 110 and 115 are located in a geographical area covered by detectors 120, 130, 140 and 150. Entities 110 and 115 can be either stationery or mobile, and are illustrated as having associated velocity vectors (shown as arrows in FIG. 1). Detectors 120-150 can also be either stationery or mobile, as long as their position and velocity are known at a time in which they provide data.

One type of data that certain detectors can provide is a line of bearing (LOB) between the detector and the entity. Such a LOB can include a bearing angle to the entity, as well as the time and position of the sensor determining the LOB. Other types of data can be generated by different detectors, such as a range to an entity or the received power of a signal at a detector.

Examples of detectors that can generate data usable with embodiments of the present invention include the following: multi-axis magnetometers that can provide azimuth/elevation angles to an entity; laser sensors that can provide range or angle to an entity; capacitative sensors that can provide range to an entity; radio frequency sensors that can provide angle, range, time difference of arrival (with two measurements), and location of an entity; radar sensors that can provide range, time difference of arrival (e.g., bistatic radar), location, and velocity of an entity; acoustic and seismic sensors that can provide proximity, range, and angle to an entity; electro-optical sensors that can provide range (e.g., field of view), location and angle to an entity; and, infrared sensors that can provide proximity and azimuth/elevation to an entity.

Figure 2:
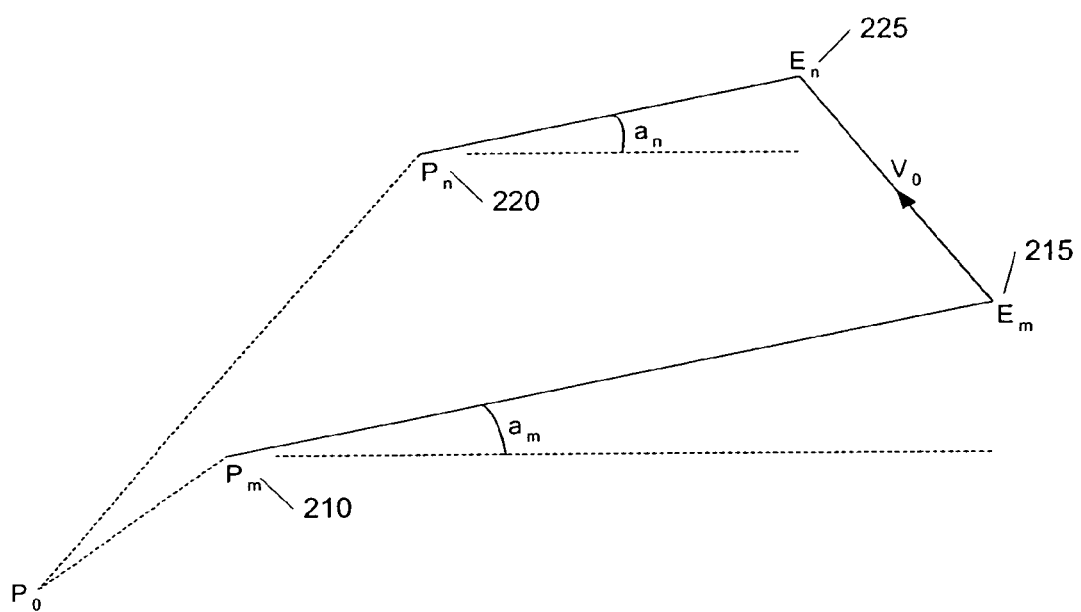
FIG. 2 is a diagram illustrating an example of data values that can be provided by a detector for determining lines of bearing that can be manipulated by an embodiment of the present invention.

FIG. 2 is a diagram illustrating an example of data that can be provided by a detector determining lines of bearing. A measurement platform (P) makes angle measurements corresponding to a given mobile entity (E) at several different measurement locations. At a time m, the measurement platform is located at location $P_m$ (210), and the entity is at location $E_m$ (215). Angle $a_m$ represents the real angle between the vector from 210 to 215 and a baseline direction illustrated by the dotted horizontal line. If the measurement platform provides a measured angle to the entity, $b_m$, and not $a_m$, then the accuracy of the measured angle at time m is a difference between the measured angle, and the real angle determined by the actual geometry ($b_m - a_m$).

At a later time, n, the measurement platform is at location 220 and the entity is location 225. Again, the real angle determined by the actual geometry at the time of the measurement is $a_n$ while the measured angle is $b_n$.

The set of measured and real angles can be used to determine the position and location of an entity by minimizing a sum of the squares of all of the differences between each angle measurement and the correct angle at each measurement point ($\Sigma_m(b_m - a_n)^2$). There are several ways to solve such a problem. In one example, the entity is assumed to be traveling at a constant, but as of yet unknown, velocity $V_0$ during a given set of measurements (illustrated by the vector between locations 215 and 225 in FIG. 2). Using such an approach, the above sum becomes a function of four variables: the x and y position of the entity at some fixed time and the x and y components of the velocity of the entity over the time period of the measurement set.

A method of solving such a set of equations is to take the partial derivatives of the sum with respect to each variable and set the partial derivative equations equal to 0. This results in a system of simultaneous equations to be solved. One approach for solving the system of simultaneous equations is to use a conjugate-gradient method, which is an iterative method to solving equations. Such an iterative method estimates a solution, computes the error for that solution, and makes an improved estimate based on those errors.

Convergence of a conjugate-gradient method can be slow, potentially requiring a large number of iterations to arrive at an accurate solution. In order to reduce the number of iterations, having a very good initial estimate is desirable. Another issue that should be addressed prior to providing data to an analysis module using conjugate-gradient techniques is determining whether a plurality of signal measurements are associated with a single entity of interest, or if other entities using the same frequency, or same frequency band, may be operating in the vicinity of the entity of interest.

Embodiments of the present invention provide a technique for arriving at a good initial position estimate, taking into account data received from all relevant detectors.

One embodiment of the present invention addresses the initial estimate and identification of entity issues by, in part, applying artifacts representing the LOBs (or other detector data) to a two-dimensional grid (e.g., drawing a graphical representation of the sensor data on a set of pixels representing the area of interest). Where the artifacts representing the detector data overlap, the data associated with those overlapping areas can be provided to an analysis module (e.g., conjugate-gradient module) to determine the location and velocity of the entity.

Figure 3:
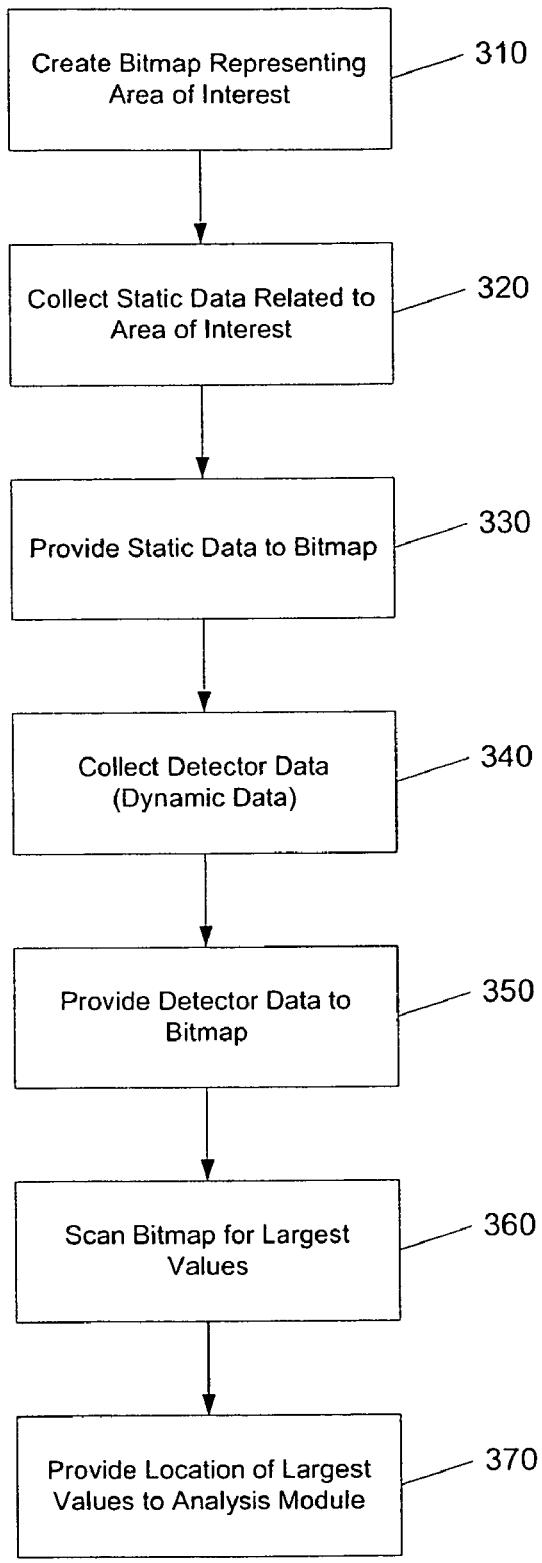
FIG. 3 is a flow diagram illustrating one embodiment of a process to arrive at an initial estimate of position and velocity, in accord with one embodiment of the present invention.

FIG. 3 is a flow diagram illustrating one embodiment of a process to arrive at an initial estimate of position and velocity, in accord with one embodiment of the present invention. A bitmap representing the geographic area of interest (e.g., the area covered by the detectors) is created (310). The bitmap should have a resolution sufficient to show details of importance in the area of interest. For example, if streets are important then pixels within the bitmap should reflect sufficient resolution to provide the streets.

It should be noted that use of a bitmap data structure is discussed above as an example. Other data structures, such as arrays can be used to store the information discussed herein. It should also be noted that, while discussion herein is presented in terms of graphical display, the information stored in the data structure need not be displayed on a computer display device in order to be manipulated in accord with the present invention.

Static data related to the area of interest is collected (320). Static data can represent roads, buildings, barriers, known installations, and the like; that is, information related to objects and geographical structures that will not move during the time period of interest. The static data can also related to any other registered data for which it is desired to maintain in a fixed location in the data structure (e.g., bitmap or array). The static data is then provided to the corresponding locations in the bitmap (330). As will be discussed in greater detail below, such data can be provided to the bitmap using, for example, an "additive pen" operation in which a value associated with a pixel on which the data is provided is incremented upon such provision, thus making a particular area in the bitmap more attractive as a location in which to find an entity (e.g., a road). Similarly, a "subtractive pen" operation can be employed to decrement a pixel on which the data is provided in order to make that location less attractive as a location in which to find an entity (e.g., a swamp). As an example, an "additive pen" can be a computer graphics pen that increases a bitmap pixel color value by an incremental amount when used to draw an object on that bitmap.

Dynamic or transient data is also collected by the various detectors covering the area of interest (340). Such data can be, for example, from one or more moving or stationery detectors. The dynamic data is then provided to the bitmap (350). Again, provision of the dynamic data to the bitmap can also be performed through the use of an additive pen operation. Alternatively, the static and dynamic data can be stored in separate data structures which can be subsequently analyzed or the data ultimately combined in one or the other data structure or a third data structure.

Lines of bearing, as discussed above, are one type of dynamic data objects that can be provided to the bitmap. Other types of sensor data can be used to generate various types dynamic data objects including, for example: range data may produce a filled annular ring or filled sector centered on the sensor; angle data may produce a line of bearing or filled wedge emanating from the sensor; time difference of arrival data may produce hyperbolas with widths running between sensors; location data may produce a filled ellipse (e.g., uncertainty in two directions) centered on an entity; velocity data may produce a line of bearing or a filled wedge emanating from the entity, once location is determined; and, proximity data may produce a filled ellipse around the sensor.

Once the dynamic data is provided to the bitmap, the bitmap can be scanned for the largest values associated with the pixels in the bitmap (360). For example, for each additive pen operation associated with a specific pixel, the color intensity value of that pixel will be incremented (or decremented, depending upon the data). The largest pixel values should be where the majority of the data, both static and dynamic, has converged. These convergence locations and other data within a predetermined vicinity of those locations can be provided to the analysis module for analysis and determination of location and velocity of the emitter of interest (370).

As discussed above, static and dynamic data related to the area of interest is provided to corresponding pixels in a bitmap representing the area of interest. In order to represent that data has been provided to a pixel in the bitmap, an operation can be performed that increments or decrements a value associated with that pixel. Thus, any static or dynamic (detector) data can be drawn onto the bitmap and an indication that some data is associated with a particular pixel is reflected in the value associated with the pixel. During such an operation, it is preferable that the value be incremented by a fixed value (e.g., 1) such as one, or decremented by the same fixed value.

One approach to performing such an operation can take advantage of alpha channel functionality in a computer system's graphics card and/or graphics software. The alpha value associated with the alpha channel relates to the transparency of a pixel's color; that is, the extent to which a pixel's color is blended with the background color. Thus, alpha blending is a pixel-by-pixel blending of source and background color data, wherein each component of a pixel's existing background color (e.g., red, green, blue) is blended with a corresponding color component of the new source color. For example, under Microsoft Windows® GDI+ (Graphical Device Interface) application programming interface, the alpha channel uses floating point arithmetic to combine new source intensity data in red, green, or blue with old background intensity data using the following rule:

displayColor=sourceColor×alpha/255+backgroundColor×(255−alpha)/255 wherein the resulting displayColor value is rounded to the nearest integer intensity. A more general restatement of this formula, extended to arbitrary bitmap depths, is:

displayColor=sourceColor×alpha/maxColor+backgroundColor×(maxColor−alpha)/maxColor wherein maxColor is the maximum color component value supported by the system.

For example, if alpha=1 and sourceColor=255, then the above formula (when backgroundColor<128) is effectively:

displayColor=backgroundColor+1

For backgroundColor≧128, round-off in the base formula causes this approximation to fail. Examples of combinations of alpha and sourceColors for unit incremental and decremental additions over a range of base image colors are provided in the following two tables.

TABLE 1

(Additive)

| Alpha | Source Color | Valid Background Range Start | Valid Background Range End | Display Range Intensity Effect |
|---|---|---|---|---|
| 1 | 255 | 0 | 127 | Previous Color + 1 |
| 2 | 191 | 0 | 127 | Previous Color + 1 |
| 2 | 192 | 1 | 128 | Previous Color + 1 |
| 2 | 193 | 2 | 129 | Previous Color + 1 |
| 2 | ... | ... | ... | ... |
| 2 | 253 | 62 | 189 | Previous Color + 1 |
| 2 | 254 | 63 | 190 | Previous Color + 1 |
| 2 | 255 | 64 | 191 | Previous Color + 1 |

TABLE 2

(Subtractive)

| Alpha | Source Color | Valid Background Range Start | Valid Background Range End | Display Range Intensity Effect |
|---|---|---|---|---|
| 1 | 0 | 128 | 255 | Previous Color − 1 |
| 2 | 0 | 64 | 191 | Previous Color − 1 |
| 2 | 1 | 65 | 192 | Previous Color − 1 |
| 2 | 2 | 66 | 193 | Previous Color − 1 |
| 2 | ... | ... | ... | ... |
| 2 | 62 | 126 | 253 | Previous Color − 1 |
| 2 | 63 | 127 | 254 | Previous Color − 1 |
| 2 | 64 | 128 | 255 | Previous Color − 1 |

Tables 1 and 2 demonstrate that the single combination with the widest applicable range is when alpha=2 and when the base image colors range between 64-191. Over this range, drawing with an intensity (source color) of zero will subtract one count from the image pixel, and drawing with an intensity of 255 will add one count to an image pixel. Thus, every object added to the bitmap, using such a formula, increases or decreases each affected pixel's intensity by a count of one. This effect can be achieved by defining an additive pen operation or a subtractive pen operation. Any drawing function (lines, circles, rectangles, splines, etc.) that uses these pens will add or subtract one pixel intensity count from the bitmap pixels traversed by the pen.

Figure 4:
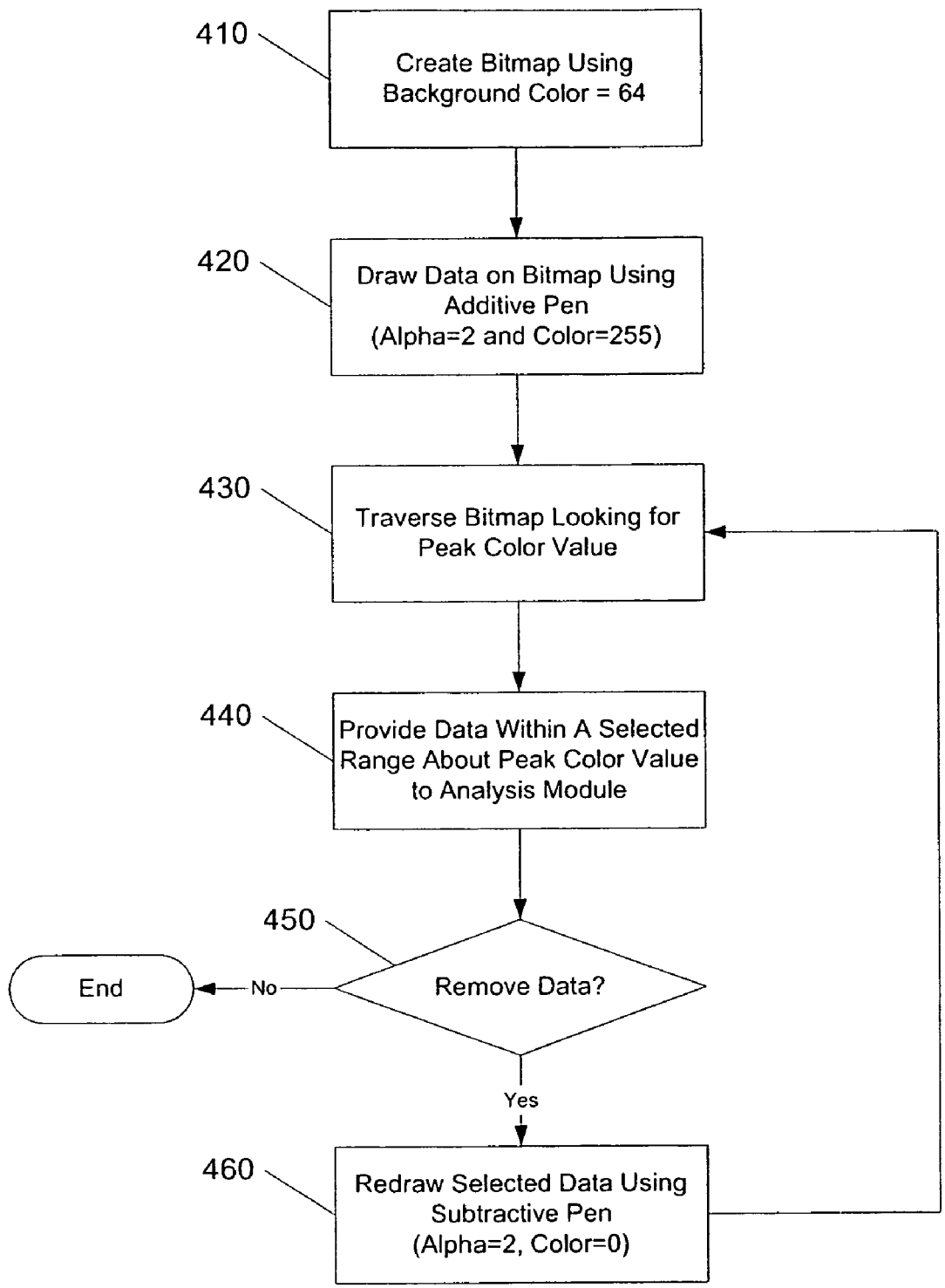
FIG. 4 is a flow diagram illustrating utilizing a graphical additive pen, in accord with one embodiment of the present invention.

FIG. 4 is a flow diagram illustrating utilizing a graphical additive pen, in accord with one embodiment of the present invention. A bitmap can be created using a background color equal to 64. That is, an RGB value for the background color can be set to RGB (64, 64, 64). Data can then be provided to the bitmap using alpha=2 and a color value equal to 255 (420). Thus, static data and dynamic data can be drawn in the bitmap using an additive pen defined, as for example in the Microsoft Windows® GDI+ environment, by a function such as Pen penAdd=new Pen(Color.FromArgb(2,255,255,255),1)

In the GDI+ environment, the Pen object stores features for rendering a line, such as color and width. In the above statement, the Color object is created with a Color.FromArgb method. The values used to create the Color object—(2, 255, 255, 255)—correspond to the alpha, red, green, and blue components of the color. The additional value used to create the Pen object (here a "1") is the width of the line drawn by the Pen. Thus, each artifact drawn in the bitmap using an additive pen defined as above will increment the value of the pixel by one.

Once all desired data has been provided to the bitmap, the bitmap can be traversed to find peak color values among the pixels in the bitmap (430). Data related to a selected range of pixels about each pixel having the peak color value can then be provided to a data analysis module, such as the above-discussed conjugate-gradient module (440). Alternatively, the resolution of the analysis can be altered by using bins as input to the data analysis module in which each bin includes values from a plurality of pixels (e.g., two or four pixels per bin). Resolution can also be variable across the bitmap, with a lower number of pixels per bin in an area of interest and a higher number of pixels per bin in areas of lesser interest.

An alternative method of locating probable locations of an entity from the bitmap is to use an image histogram of bitmap color values, wherein bin numbers represent color values and bin counts represent the number of pixels having those color values. The maximum histogram color value with a non-zero count can then be identified and the bitmap can be searched for entities near pixels with that color value. As an entity is identified, the pixels with that intensity can be removed from the image (using, for example, a subtractive pen) and then the bitmap can be analyzed for pixels at or near the next highest histogram color value.

As an example, assume a scenario in which a number of entities are subject to detection by a number of sensors. Assume further that some sensors are able to detect approximate angles, others approximate ranges, and still others approximate differences in arrival times from entity emissions. These artifacts can be rendered into the bitmap as follows. An angle is drawn as a wedge emanating from the sensor in the direction of a given entity, wherein the width angle of the wedge represents an uncertainty in the physics of the angle measurement. A range is drawn as an annular ring (or sector) about the sensor with the width of the ring representing the uncertainty in the physics of the range measurement. A time difference is drawn as a hyperbola with respect to two sensor locations, wherein the width of the hyperbola represents the uncertainty in the physics of the arrival time measurements.

Each of these artifacts can be provided to the bitmap using an additive pen with standard graphics library plotting commands such as DrawLine or DrawEllipse. Each time an artifact overlays another artifact in the drawing operation, the pixel intensity in the overlapping areas increases by one. After all the artifacts are drawn, if the bitmap were to be viewed, one or more bitmap pixels would have the largest (brightest) intensity values. The determination of the maximum intensity value can be performed by iterating through the bitmap. In a language such as C++, this can be done by means of a pointer that moves through the bitmap in raster scan fashion, one pixel at a time. If a value larger than the current intensity value is found, the new, larger, intensity value and its location are recorded. This operation can be made quite fast using standard programming techniques.

After the maximum intensity is found, further analysis operations can be performed (440). For example, the area around this intensity can be analyzed to determine the extent of the area of intensity in each direction. The extent may include pixels with similar (but not necessarily equal) pixel values. Once the extent is determined the extent can be used in other computations.

For example, the center of the extent may be used as the basis for an estimate of the initial position of an entity. Once the initial position estimate is specified, each sensor can be tasked with determining which of that sensor's artifacts contributed to the estimate by determining which artifacts contributed to the maximum value. A number of wedges, annular rings, and hyperbolas may have combined to create this initial maximum intensity. These items, once determined, can be used to refine the entity's position using the aforementioned least squares method and the data associated with these graphical artifacts, that is, the error between the correct encounter geometry's value and the associated measured value. For the angle measurements the error is an angle, for the range measurements the error is a range, and for the time difference measurements the error is a delta time. When combining these measurements in an error calculation, care should be taken to normalize measurement values such that comparable measurement errors in the various hardware components provide comparable errors in the conjugate gradient computation.

Once an analysis of the data has been performed by the analysis module, it can be determined whether the data analyzed should be removed from the bitmap in order to find the location of another emitter of interest (450). If it is not desired to remove such data, then the process is ended and data can be collected for another iteration of the process. If it is desired to remove the previously analyzed data, the graphical artifacts representing that data can be redrawn using a subtractive (or negative) pen having alpha=2 and color=0 (460). As with the additive pen, one example of a defining statement for a subtractive pen (e.g., from Microsoft Windows® GDI+) is as follows:

Pen penSub=new Pen(ColorFromArgb(2,0,0,0),1)

At this point the above maximum value detection and initial entity position estimate operations are repeated until some criteria is satisfied such as the exhaustion of all graphical bitmap artifacts on the bitmap or an insufficiency of such artifacts.

At a later point in time, the above process can be repeated for a second analysis. In such cases, entities from the first analysis may not appear in the second analysis and entities in the second analysis may not appear in the first analysis. Depending on the scenario scale and the type of detectors, entities may be considered to have moved according to motion feasibility rules. This can be determined quickly by considering two bitmap images representing different short spans of time. In such cases, two nearby entities can be hypothesized as one and the velocity from one position to the other can be calculated. The conjugate gradient method can then be applied to the artifacts that contribute to this hypothesis. Depending on the size of the resulting errors, the motion hypothesis can then be accepted or rejected.

When using the general alpha formula above, other ranges derive from the use of the above-described additive and subtractive pens. For example, when using 16-bits (maximum color component value of 65535) per color component, a valid range for these pens is [16384, 49151] inclusive.

Another useful feature is to define a neutral pen, which is a pen that has no effect when drawing in that pen's effective range. For 8-bit color components, the value 127 is valid over the inclusive range [64, 190], and for 16-bit color components, the value 32767 is valid over the inclusive range [16384, 49150]. In these cases, the valid upper limit is decreased by one compared to the additive and subtractive pens. A pen with alpha-red-green-blue component values of (2, 255, 127, 0), respectively, increments the red component, decrements the blue component, and leaves the green component unchanged for each pixel value that pen touches, over the inclusive range [64, 190].

It will be recognized that the additive range for color values given alpha=2 and base color=64 is limited to a delta count limit of 128. That is, using the above formulas, once a color value arrives at 192 a pixel cannot be incremented beyond that point. In order to address this problem, rescaling of image colors can be performed by drawing, for example, a rectangle with an appropriate sourceColor and alpha value over the entire bitmap. For example, a sourceColor=64 and alpha=128 results in linear rescaling of an image into a range of 64-128. Similarly, using a sourceColor=64 and alpha=192, the image can be linearly rescaled into the range 64-95.

An advantage of using these graphical techniques is that multiple different types of data artifacts can be provided to the bitmap. For example, artifacts related to lines of bearing can be either a single line or a cone (or wedge) representing the error in the angular measurement. Similarly, range data can be represented by a range (annular) ring provided by drawing concentric circles that are then rendered filled using the additive pen.

In addition, data can be weighted according to the importance of the data or the accuracy of the detector sending the data. Such weighting can be provided by providing the data to the bitmap multiple times and thereby incrementing the color intensity values associated with the pixels to which the data artifact is provided.

An Example Computing and Network Environment

As shown above, the present invention can be implemented using a variety of computer systems and networks. An example of one such computing and network environment is described below with reference to FIGS. 5 and 6.

Figure 5:
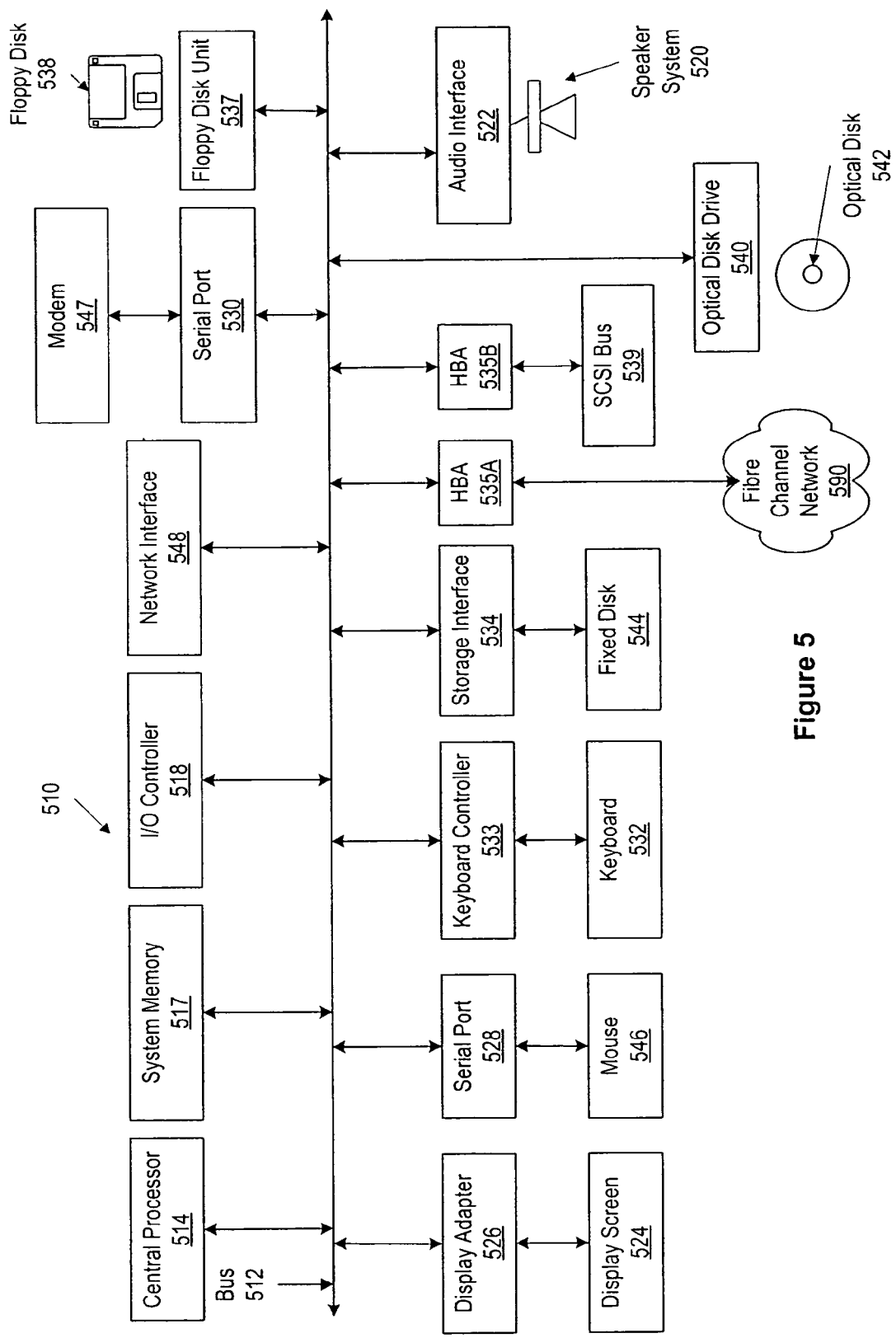
FIG. 5 depicts a block diagram of a computer system suitable for implementing an embodiment of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium such as removable media in an autoloader 110. Additionally, applications can be in the form of electronic signals modulated in accordance with the application and data communication technology when accessed via network modem 547 or interface 548.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
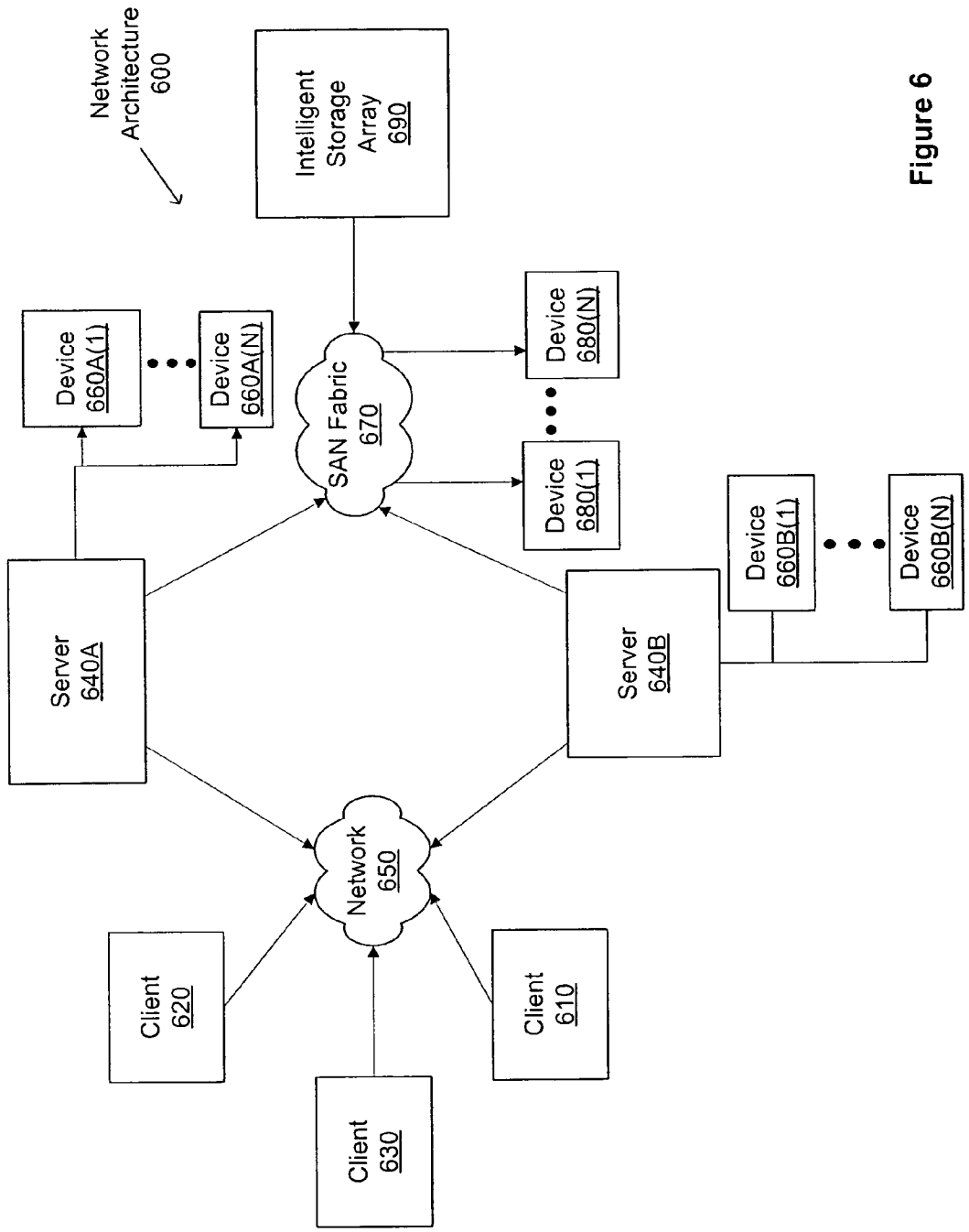
FIG. 6 is a block diagram depicting a network architecture suitable for implementing an embodiment of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1) (N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
providing a bitmap corresponding to a two-dimensional array of pixels;
applying an object to the bitmap, using a processor configured to perform alpha channel operations, wherein
said applying increments a value associated with a pixel touched by the object using an alpha channel operation to perform a blending of a source value with the value associated with the pixel, and
the source value and a transparency value are defined such that the value is incremented by a fixed quantity upon said applying; and
populating a two-dimensional array of values comprising the value.

2. The method of claim 1 wherein the value corresponds to a display color of the pixel.

3. The method of claim 1 wherein the object is a line of bearing (LOB).

4. The method of claim 1 further comprising:
defining the object from collected data.

5. The method of claim 4 further comprising:
collecting the collected data using one or more of a laser sensor, a capacitative sensor, a radio frequency sensor, a radar, an acoustic sensor, a seismic sensor, an electro-optical sensor, an infrared sensor, and a magnetometer.

6. The method of claim 1 wherein the object is a hyperbola.

7. The method of claim 6 further comprising:
defining the hyperbola from measurements based on a time difference for a signal to reach a plurality of spatially diverse sensors.

8. The method of claim 1 further comprising:
collecting data, wherein
features of the object correspond to the data.

9. The method of claim 8 wherein the features comprise:
one or more of shape, location in the two-dimensional array, and a weighting amount for the value.

10. The method of claim 9 wherein the shape comprises:
one or more of a line, a wedge, a hyperbola, and an ellipse.

11. The method of claim 8 further comprising:
using a sensor to collect the data, wherein
the data corresponds to an entity having a signature detectable as one or more of an electromagnetic signal, an acoustic signal, a seismic signal, an optical signal, and an infrared signal.

12. The method of claim 1 wherein the object corresponds to a geographical feature.

13. The method of claim 12 further comprising:
biasing the value in the two-dimensional array of values in favor of the geographical feature by incrementing the value by a predetermined quantity.

14. The method of claim 12 further comprising:
biasing the value in the two-dimensional array of values against the geographical feature by decrementing the value by a predetermined quantity.

15. The method of claim 12 further comprising:
selecting the geographical feature using demographics.

16. The method of claim 1 further comprising:
analyzing the two-dimensional array of values for a peak value; and providing the corresponding location in the two-dimensional array of pixels of the peak value to a geolocation software, wherein
the peak value corresponds to a location of a detectable entity.

17. The method of claim 1 further comprising:
analyzing the two-dimensional array of values for contours in a region of a peak value; and
drawing the contours in the two-dimensional array of pixels.

18. An apparatus comprising:
a memory configured to store a bitmap, wherein
the bitmap corresponds to a two-dimensional array of pixels; and
a processor coupled to the memory and configured to
apply an object to the bitmap, wherein
said applying increments a value associated with a pixel touched by the object using a blending of a source value with the value, and
the source value and a transparency value are defined such that the value is incremented by a fixed quantity upon said applying, and
populate a two-dimensional array of values comprising the value.

19. The apparatus of claim 18 further comprising:
the processor further configured to define the object from collected data.

20. The apparatus of claim 18 further comprising:
the processor further configured to
analyze the two-dimensional array of values for a peak value, and
provide the corresponding location in the two-dimensional array of pixels of the peak value to a processor configured to execute a geolocation software, wherein the peak value corresponds to a location of a detectable entity.

21. The apparatus of claim 18 further comprising:
the processor further configured to
analyze the two-dimensional array of values for contours in a region of a peak value, and
draw the contours in the two-dimensional array of pixels.

22. A system comprising:
means for providing a bitmap corresponding to a two-dimensional array of pixels;
means for applying an object to the bitmap, wherein
means for applying comprises a means for incrementing a value associated with a pixel touched by the object using a blending of a source value with the value associated with the pixel, and
the source value and a transparency value are defined such that the value is incremented by a fixed quantity upon said applying; and
means for populating a two-dimensional array of values comprising the value.

23. The system of claim 22 further comprising:
means for analyzing the two-dimensional array of values for a peak value; and
means for providing the corresponding location in the two-dimensional array of pixels of the peak value to a geolocation software, wherein
the peak value corresponds to a location of a detectable entity.

24. The system of claim 22 further comprising:
means for analyzing the two-dimensional array of values for contours in a region of a peak value; and
means for drawing the contours in the two-dimensional array of pixels.

* * * * *